United States Patent
Yamamoto et al.

(10) Patent No.: US 8,093,879 B2
(45) Date of Patent: Jan. 10, 2012

(54) SEMICONDUCTOR CIRCUIT

(75) Inventors: Ryuji Yamamoto, Yao (JP); Nobuyuki Ohtaka, Kadoma (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 355 days.

(21) Appl. No.: 12/559,017

(22) Filed: Sep. 14, 2009

(65) Prior Publication Data
US 2010/0066330 A1 Mar. 18, 2010

(30) Foreign Application Priority Data
Sep. 16, 2008 (JP) ................................. 2008-236832

(51) Int. Cl.
G05F 1/40 (2006.01)

(52) U.S. Cl. ......................... 323/285; 323/266; 361/93.9

(58) Field of Classification Search .................. 323/222, 323/224, 266, 267, 271, 282–288; 361/93.9, 361/100, 115
See application file for complete search history.

(56) References Cited

U.S. PATENT DOCUMENTS

| | | | | |
|---|---|---|---|---|
| 4,618,812 A | * | 10/1986 | Kawakami | 323/224 |
| 5,084,666 A | * | 1/1992 | Bolash | 323/283 |
| 5,559,424 A | * | 9/1996 | Wrathall et al. | 323/277 |
| 5,859,757 A | * | 1/1999 | Hanafusa et al. | 361/100 |
| 6,304,066 B1 | * | 10/2001 | Wilcox et al. | 323/282 |
| 7,626,362 B2 | * | 12/2009 | Guang et al. | 320/135 |

FOREIGN PATENT DOCUMENTS

JP 2007-159299 6/2007

OTHER PUBLICATIONS esp@cenet patent abstract for Japanese Publication No. 2007159299, Publication date Jun. 21, 2007 (1 page).

* cited by examiner

*Primary Examiner* — Rajnikant Patel
(74) *Attorney, Agent, or Firm* — Osha • Liang LLP

(57) ABSTRACT

A semiconductor circuit (10a) comprises a first terminal section (17) to be connected to a connection point of two external resistors; a second terminal section (18) to be connected to an external circuit; a voltage circuit section having a first terminal connected to the second terminal section (18); a reference voltage circuit section (102) which outputs a predetermined voltage; an operational amplifier (104) having a first input terminal connected to the reference voltage circuit section (102), a second input terminal connected to the first terminal section (17), and an output terminal connected to a second terminal of the voltage circuit section; an abnormality detecting circuit which detects an abnormal voltage of the first terminal section (17); a normal signal generating unit (130) which generates a normal signal; and a switching circuit which, when the abnormality detecting circuit detects the abnormal voltage, does not output a voltage based on the first terminal section (17) to the second terminal section (18) and instead outputs a normal voltage based on the normal signal to the second terminal section (18).

7 Claims, 4 Drawing Sheets

SEMICONDUCTOR CIRCUIT

CROSS-REFERENCE TO RELATED APPLICATIONS

This application claims priority from Japanese Patent Application No. 2008-236832 filed on Sep. 16, 2008, the entire disclosure of which is incorporated herein by reference.

BACKGROUND OF THE INVENTION

1. Field of the Invention

The present invention relates to a semiconductor circuit, and in particular to a semiconductor circuit having an operational amplifier.

2. Description of the Related Art

As circuits which control an input voltage and obtain a stabilized output voltage, there are known circuits such as a series regulator, a switching regulator, and a charge pump circuit. For example, JP 2007-159299A discloses a low voltage output regulator.

In a circuit such as a series regulator, there is used an operational amplifier which has an output voltage divided by resistor elements which form a negative feedback circuit and which has the divided voltage input as a feedback signal. More specifically, a reference voltage is connected to a first input terminal of the operational amplifier, and a second input terminal is connected to resister elements which divide the output voltage of the operational amplifier. Here, in order to change the resistance values of the resistor elements so as to adjust the output voltage of the operational amplifier, an external resistor element may be mounted outside of the circuit having the operational amplifier.

When the semiconductor circuit and the external resistor elements described above are mounted on a printed circuit board, if the electrical connection is lost, such as by detachment of the external resistor element, the negative feedback circuit of the operational amplifier is disconnected. When this occurs, the operational amplifier functions as a comparator, the output voltage becomes higher than the voltage during normal operation, and an excessive voltage may be applied to an external load which is connected to the output terminal of the operational amplifier (comparator)

SUMMARY OF THE INVENTION

An advantage of the present invention is provision of a semiconductor circuit which prevents application of an excessive voltage to an external load even when electrical connection of an external resistor element is lost.

According to one aspect of the present invention, there is provided a semiconductor circuit comprising a first terminal section to be connected to a connection point between two external resistors which are connected in series; a second terminal section to be connected to an input terminal of an external circuit; a voltage circuit section having a first terminal connected to the second terminal section; a reference voltage circuit section which outputs a predetermined voltage; an operational amplifier having a first input terminal connected to the reference voltage circuit section, a second input terminal connected to the first terminal section, and an output terminal connected to a second terminal of the voltage circuit section; an abnormality detecting circuit which detects an abnormal voltage of the first terminal section; a normal signal generating unit which generates a normal signal; and a switching circuit which, when the abnormality detecting circuit detects an abnormal voltage, does not output a voltage based on the first terminal section to the second terminal section and instead outputs to the second terminal section a normal voltage based on the normal signal.

According to the semiconductor circuit of the above-described structure, the voltage based on the first terminal section is not output to the second terminal section, and instead the normal voltage based on the normal signal is output to the second terminal section. With this structure, even when the electrical connection of the external resistor element is lost, it is possible to prevent application of an excessive voltage to the external load connected to the second terminal section.

BRIEF DESCRIPTION OF THE DRAWINGS

Preferred embodiments of the present invention will be described in detail by reference to the drawings, wherein.

DESCRIPTION OF THE PREFERRED EMBODIMENTS

Preferred embodiments of the present invention will now be described in detail with reference to the drawings. In this description, specific shapes, materials, numerical values, directions, etc. are given merely for exemplary purposes for facilitating understanding of the present invention, and may be suitably changed according to usage, objectives, specifications, etc.

Figure 1:
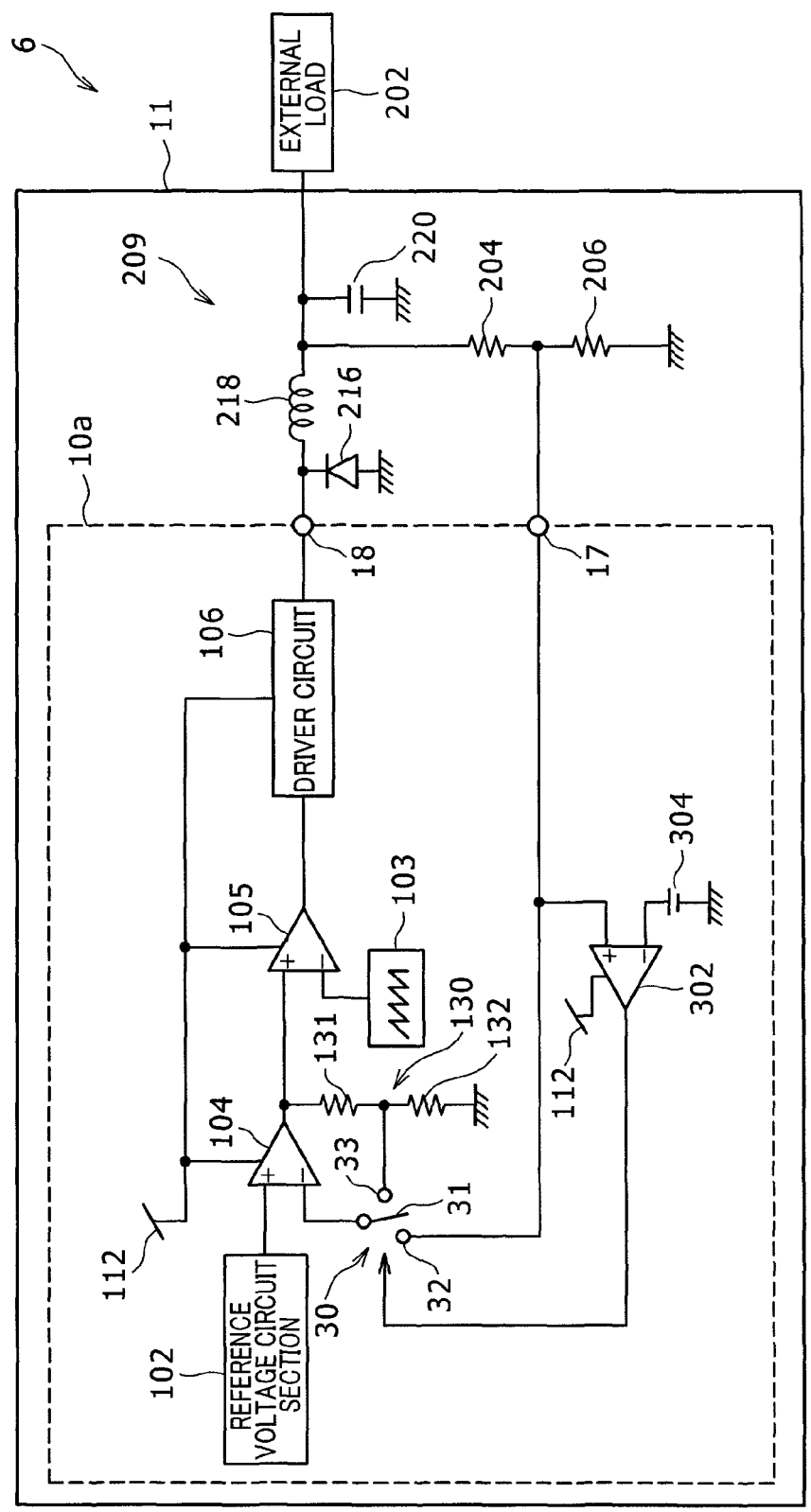
FIG. 1 is a diagram showing a semiconductor circuit according to a first preferred embodiment of the present invention and a power supply device having the semiconductor circuit.

FIG. 1 is a diagram showing a semiconductor circuit 10a according to a first preferred embodiment of the present invention and a power supply device 6 having the semiconductor circuit 10a. The power supply device 6 comprises the semiconductor circuit 10a, a first external resistor element 204, a second external resistor element 206, a rectifying circuit section 209, and a printed circuit board 11. The power supply device 6 and an external load 202 are electrically connected. The external load 202 is described as being provided external to the power supply device 6, but may alternatively be provided in the power supply device 6; that is, may be mounted on the printed circuit board 11.

The printed circuit board 11 is a plate-shaped or film-shaped component which forms an electronic circuit by fixation of a plurality of electronic components such as a semiconductor circuit, a resistor element, and a capacitor on a surface of the printed circuit board 11, and connecting between the components with lines. On the printed circuit board 11, the semiconductor circuit 10a, the first external resistor element 204, the second external resistor element 206, and the rectifying circuit section 209 are mounted.

The semiconductor circuit 10a comprises a reference voltage circuit section 102, an operational amplifier 104, a power supply section 112, a sawtooth wave voltage generating circuit 103, a PWM comparator 105, a driver circuit 106, a normal signal generating unit 130, a switching circuit 30, an abnormality detection comparator 302, an abnormality detection reference voltage section 304, a first terminal section 17, and a second terminal section 18. The driver circuit 106 and the PWM comparator 105 are in combination considered a voltage circuit section.

The reference voltage circuit section 102 is a circuit which is connected to a first input terminal of the operational amplifier 104 and outputs a predetermined reference voltage. The operational amplifier 104 has a function to generate, as an error signal, an error between a voltage which is input to the first input terminal and a voltage which is input to a second input terminal. The error signal has a greater value as the difference between the two voltages becomes greater. The first input terminal of the operational amplifier 104 is connected to the reference voltage circuit section 102, and the second input terminal is connected to the switching circuit 30. An output terminal of the operational amplifier 104 is connected to an input terminal of the normal signal generating unit 130 and an input terminal of the PWM comparator 105. Details of the normal signal generating unit 130 and the switching circuit 30 will be described later.

The PWM comparator 105 outputs a High voltage when the voltage on a first input terminal is higher than the voltage on a second input terminal, and outputs a Low voltage when the voltage on the first input terminal is lower than the voltage on the second input terminal. The PWM comparator 105 has the first input terminal connected to the output terminal of the operational amplifier 104 and a second input terminal connected to the sawtooth wave voltage generating circuit 103, and has a function to generate a PWM signal. The sawtooth wave voltage generating circuit 103 has a function to generate a sawtooth wave voltage of a predetermined amplitude. Although it has been described that the sawtooth wave voltage is input to the second input terminal of the PWM comparator 105, alternatively, a triangular wave voltage may be input, for generating the PWM signal.

The driver circuit 106 is a circuit which suitably processes a PWM signal from the PWM comparator 105 and supplies the processed signal to the second terminal section 18 as a driver PWM signal. An output terminal of the driver circuit 106 is connected to the second terminal section 18. The power supply section 112 has a function to supply a predetermined voltage, and supplies a power supply voltage to the operational amplifier 104, the PWM comparator 105, the driver circuit 106, and the abnormality detection comparator 302. The power supply section 112 is described as being provided in the semiconductor circuit 10a, but may alternatively be provided external to the semiconductor circuit 10a.

The abnormality detection comparator 302 outputs a High voltage when the voltage on a first input terminal is higher than the voltage on a second input terminal, and outputs a Low voltage when the voltage on the first input terminal is lower than the voltage on the second input terminal. The abnormality detection comparator 302 has a first input terminal connected to the first terminal section 17, and a second input terminal connected to the abnormality detection reference voltage section 304 which outputs a predetermined abnormality detection reference voltage. An output terminal of the abnormality detection comparator 302 is connected to the switching circuit 30, for controlling the switching circuit 30 based on an output result of the abnormality detection reference voltage section 304.

The normal signal generating unit 130 comprises a first resistor element 131 and a second resistor element 132. The first resister element 131 and the second resistor element 132 are resistor elements formed from polysilicon. The first resistor element 131 is a resistor element having a first end connected to the output terminal of the operational amplifier 104. The second resistor element 132 is a resistor element having a first end connected to a second end of the first resistor element 131 and a second end grounded.

The switching circuit 30 comprises a switch body section 31 which is connected to the second input terminal of the operational amplifier 104, a first switch terminal 32 which is connected to the first terminal section 17 and the first input terminal of the abnormality detection comparator 302, and a second switch terminal 33 which is connected to a connection point between the first resistor element 131 and the second resistor element 132. The switching circuit 30 is controlled by the output of the abnormality detection comparator 302. More specifically, when the output of the abnormality detection comparator 302 is High, the switch body section 31 is connected to the first switch terminal 32, so that the second input terminal of the operational amplifier 104 is connected to the first terminal section 17 and the first terminal of the abnormality detection comparator 302. When, on the other hand, the output of the abnormality detection comparator 302 is Low, the switch body section 31 is connected to the second switch terminal 33, so that the second input terminal of the operational amplifier 104 is connected to the connection point between the first resistor element 131 and the second resistor element 132.

The rectifying circuit section 209 comprises a rectification diode 216, a rectification coil 218, and a rectification capacitor 220. The rectifying circuit section 209 rectifies a driver PWM signal which has a PWM-converted input voltage and which is output to the second terminal section 18, and outputs a predetermined voltage to the external load 202. Alternatively, the present invention can be applied to a configuration which does not have the rectification diode 216. In this case, the driver circuit 106 is connected to the power supply section 112 through a P-channel type MOS transistor and to the ground through an N-channel type MOS transistor. These transistors of the driver circuit 106 are controlled to achieve synchronization control.

The rectification diode 216 is a reverse current preventing element having a first end connected to the second terminal section 18 and a first end of the rectification coil 218, and a second end grounded. The rectification coil 218 is a coil which has the first end connected to the second terminal section 18 and the first end of the rectification diode 216, and a second end connected to the first end of the first external resistor element 204, a first end of the rectification capacitor 220, and the external load 202. In other words, the rectification coil 218 has a function to be supplied with a current from the power supply section 112 when the driver PWM signal which is output to the second terminal section 18 has the same voltage as the power supply section 112, and to store the current as electromagnetic energy. In the rectification coil 218, when the driver PWM signal has the ground voltage, the stored electromagnetic energy is transferred to the external load 202, to thereby achieve rectification.

The rectification capacitor 220 is a capacitor having a first end connected to the second end of the rectification coil 218, the first end of the first external resistor element 204, and the external load 202. The rectification capacitor 220 is supplied a current from the power supply section 112 when the driver PWM signal is in the ON state and stores the electromagnetic energy. When the driver PWM signal is in the OFF state, the stored electromagnetic energy is transferred to the external load 202, to thereby achieve rectification.

The external load 202 is an electronic circuit which operates by a voltage which is output by the semiconductor circuit 10a. The first external resistor element 204 and the second external resistor element 206 are external resistor elements which are connected in series, and are formed from, for example, a metal-coated resistor device formed from Nichrome (registered trademark) as a material. A first end of the first external resistor element 204 is connected to the second end of the rectification coil 218, and a second end of the first external resistor element 204 is connected to the first terminal section 17 and the first end of the second external resistor element 206. A first end of the second external resistor element 206 is connected to the second end of the first external resistor element 204 and the first terminal section 17, and a second end of the second external resistor element 206 is grounded.

Next, an operation of the power supply device 6 having the semiconductor circuit 10a having the above-described structure will be described with reference to FIG. 1. In the power supply device 6, when the electrical connection between the first external resistor element 204 and the second external resistor element 206, etc. is not lost, the potential on the first terminal section 17 connected to the connection point between the first external resistor element 204 and the second external resistor element 206 is at the normal potential. Because of this, the potential of the first terminal section 17 which is input to the first input terminal of the abnormality detection comparator 302 is higher than the abnormality detection reference voltage which is input to the second input terminal. Thus, the abnormality detection comparator 302 outputs High and the switch body section 31 of the switching circuit 30 is connected to the first switch terminal 32, and, consequently, a negative feedback circuit is formed with respect to the operational amplifier 104.

If, on the other hand, the first external resistor element 204 is mounted on the print circuit board 11 in the power supply device 6 in a state where the electrical connection is lost, the above-described negative feedback circuit would be disconnected. Thus, the voltage on the first terminal section 17 is at the same potential as ground (GND), the potential on the first terminal section 17 which is input to the first input terminal of the abnormality detection comparator 302 is lower than the abnormality detection reference voltage which is input to the second input terminal, and the abnormality detection comparator 302 outputs Low. In this process, because the switch body section 31 of the switching circuit 30 is connected to the second switch terminal 33, a negative feedback circuit is formed for the operational amplifier 104 by the normal signal generating unit 130.

As described above, even when the electrical connection between the first external resistor element 204 and the second external resistor element 206 is lost, the operational amplifier 104 does not function as a comparator, and the output voltage of the operational amplifier 104 does not become an excessive voltage. With this process, it is possible to prevent application of an excessive voltage to the external load 202.

Figure 2:
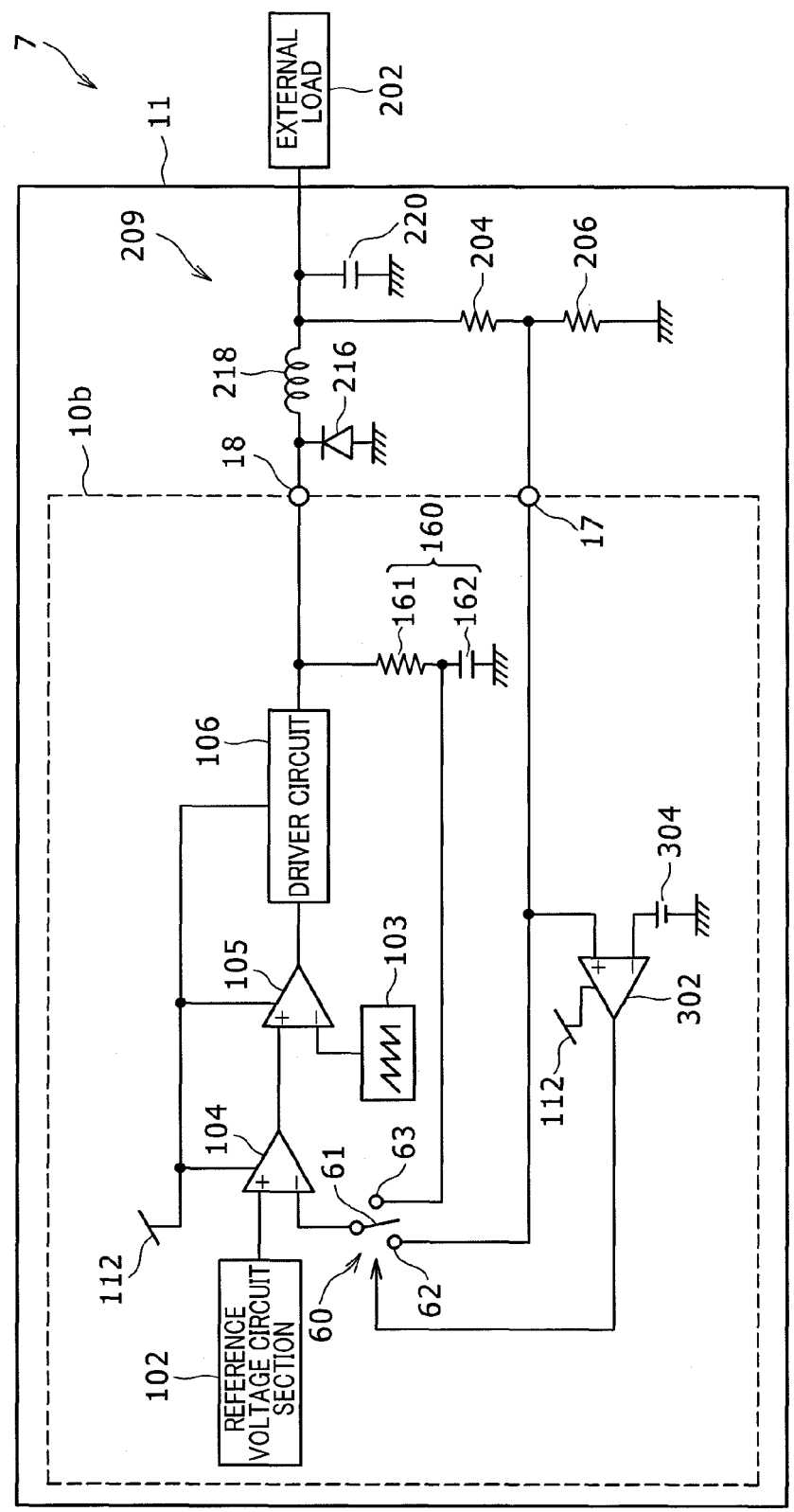
FIG. 2 is a diagram showing a semiconductor circuit according to a second preferred embodiment of the present invention and a power supply device having the semiconductor circuit.

Next, a semiconductor circuit 10b according to a second preferred embodiment of the present invention and a power supply device 7 having the semiconductor circuit 10b will be described with reference to FIG. 2. FIG. 2 is a diagram showing the semiconductor circuit 10b and the power supply device 7 having the semiconductor circuit 10b. As the structures are approximately identical with those of the semiconductor circuit 10a according to the first preferred embodiment and the power supply device 6 having the semiconductor circuit 10a, like reference numerals are assigned to like constituent elements and repeated description is omitted, and differing structures and operations will be primarily described. A difference between the semiconductor circuit 10b and the semiconductor circuit 10a lies in a normal signal generating unit 160 and a switching circuit 60.

The normal signal generating unit 160 is a smoothing circuit which comprises a smoothing resistor element 161 and a smoothing capacitor 162 and which smooths the driver PWM signal which is output from the driver circuit 106. The smoothing resistor element 161 is a resistor element formed from polysilicon, and has a first end connected to the output terminal of the driver circuit 106 and the second terminal section 18, and a second end connected to a second switch terminal 63 of the switching circuit 60 and a first end of the smoothing capacitor 162. The smoothing capacitor 162 has the first end connected to the second switch terminal 63 of the switching circuit 60 and a second end of the smoothing resistor element 161, and a second end grounded.

The switching circuit 60 comprises a switch body section 61 which is connected to the second input terminal of the operational amplifier 104, a first switch terminal 62 which is connected to the first terminal section 17 and the first input terminal of the abnormality detection comparator 302, and the second switch terminal 63 which is connected to a connection point between the smoothing resistor element 161 and the smoothing capacitor 162. The switching circuit 60 is controlled based on the output of the abnormality detection comparator 302. More specifically, when the output of the abnormality detection comparator 302 is High, the switch body section 61 is connected to the first switch terminal 62, and the second input terminal of the operational amplifier 104 is connected to the first terminal section 17 and the first input terminal of the abnormality detection comparator 302. When, on the other hand, the output of the abnormality detection comparator 302 is Low, the switch body section 61 is connected to the second switch terminal 63, and the second input terminal of the operational amplifier 104 is connected to the connection point between the smoothing resistor element 161 and the smoothing capacitor 162.

Next, an operation of the power supply device 7 having the semiconductor circuit 10b having the above-described structure will be described with reference to FIG. 2. Similar to the case of the power supply device 6 described above, when the electronic connection between the first external resistor element 204 and the second external resistor element 206 is not lost, the switch body section 61 of the switching circuit 60 is connected to the first switch terminal 62, and a negative feedback circuit is formed.

When the electrical connection of the first external resistor element 204 is lost, similar to the case of the power supply device 6, the abnormality detection comparator 302 outputs Low. Thus, the switch body section 61 of the switch circuit 60 is connected to the second switch terminal 63, and a negative feedback circuit for the operational amplifier 104 is formed by the normal signal generating unit 160. In this manner, similar to the case of the power supply device 6, with the power supply device 7 also, even when the electrical connection between the first external resistor element 204 and the second external resistor element 206 is lost, the operational amplifier 104 does not function as a comparator, and the output voltage of the operational amplifier 104 does not become an excessive voltage. With this structure, it is possible to prevent application of an excessive voltage to the external load 202.

Figure 3:
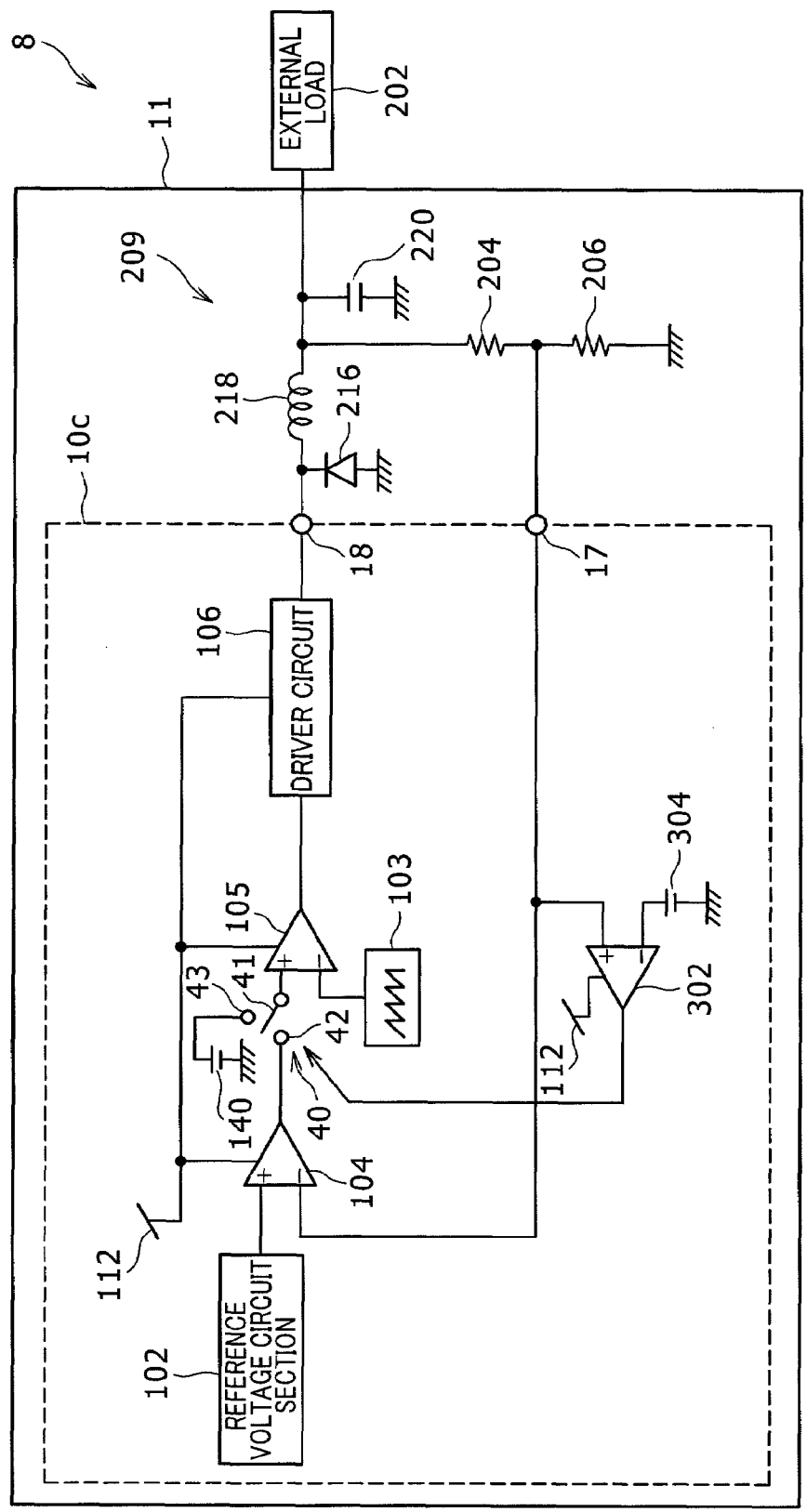
FIG. 3 is a diagram showing a semiconductor circuit according to a third preferred embodiment of the present invention and a power supply device having the semiconductor circuit.

Next, a semiconductor circuit 10c according to a third preferred embodiment of the present invention and a power supply device 8 having the semiconductor circuit 10c will be described with reference to FIG. 3. FIG. 3 is a diagram showing the semiconductor circuit 10c and the power supply device 8 having the semiconductor circuit 10c. As the devices have approximately the same structure as those of the semiconductor circuit 10a according to the first preferred embodiment and the power supply device 6 having the semiconductor circuit 10a, like reference numerals are assigned to like constituent elements and repeated description is omitted. The differing structure and operation will primarily be described. A difference between the semiconductor circuit 10c and the semiconductor circuit 10a lies in a normal signal generating unit 140 and a switching circuit 40. The second input terminal of the operational amplifier 104 is connected to the first input terminal of the abnormality detection comparator 302 and the first terminal section 17.

The normal signal generating unit 140 is a voltage source which outputs a predetermined voltage to allow the PWM comparator 105 to generate a normal PWM signal.

The switching circuit 40 comprises a switch body section 41 which is connected to the first input terminal of the PWM comparator 105, a first switch terminal 42 which is connected to the output terminal of the operational amplifier 104, and a second switch terminal 43 which is connected to the first terminal of the normal signal generating unit 140. The switching circuit 40 is controlled based on the output of the abnormality detection comparator 302. More specifically, when the output of the abnormality detection comparator 302 is High, the switch body section 41 is connected to the first switch terminal 42, and the first input terminal of the PWM comparator 105 is connected to the output terminal of the operational amplifier 104. When, on the other hand, the output of the abnormality detection comparator 302 is Low, the switch body section 41 is connected to the second switch terminal 43, and the first input terminal of the PWM comparator 105 is connected to the output terminal of the normal signal generating unit 140.

Next, an operation of the power supply device 8 having the semiconductor circuit 10c having the above-described structure will be described with reference to FIG. 3. In the power supply device 8, when the electrical connection between the first external resistor element 204 and the second external resistor element 206 is not lost, the switch body section 41 of the switching circuit 40 is connected to the first switch terminal 42, and a negative feedback circuit is formed.

When, on the other hand, the electrical connection between the first external resistor element 204 and the second external resistor element 206 is lost, similar to the case of the power supply device 6, the abnormality detection comparator 302 outputs Low. Thus, the switch body section 41 of the switching circuit 40 is connected to the second switch terminal 43. Therefore, the output voltage from the output terminal of the operational amplifier 104 is not input to the first input terminal of the PWM comparator 105, and a normal voltage is input to the first input terminal of the PWM comparator 105 from the normal signal generating unit 140. In this manner, even when the electrical connection between the first external resistor element 204 and the second external resistor element 206 is lost, a normal PWM signal is output from the PWM comparator 105, and, thus, the output voltage of the second terminal section 18 does not become an excessive voltage. With this configuration, it is possible to prevent supply of an excessive voltage to the external load 202.

Figure 4:
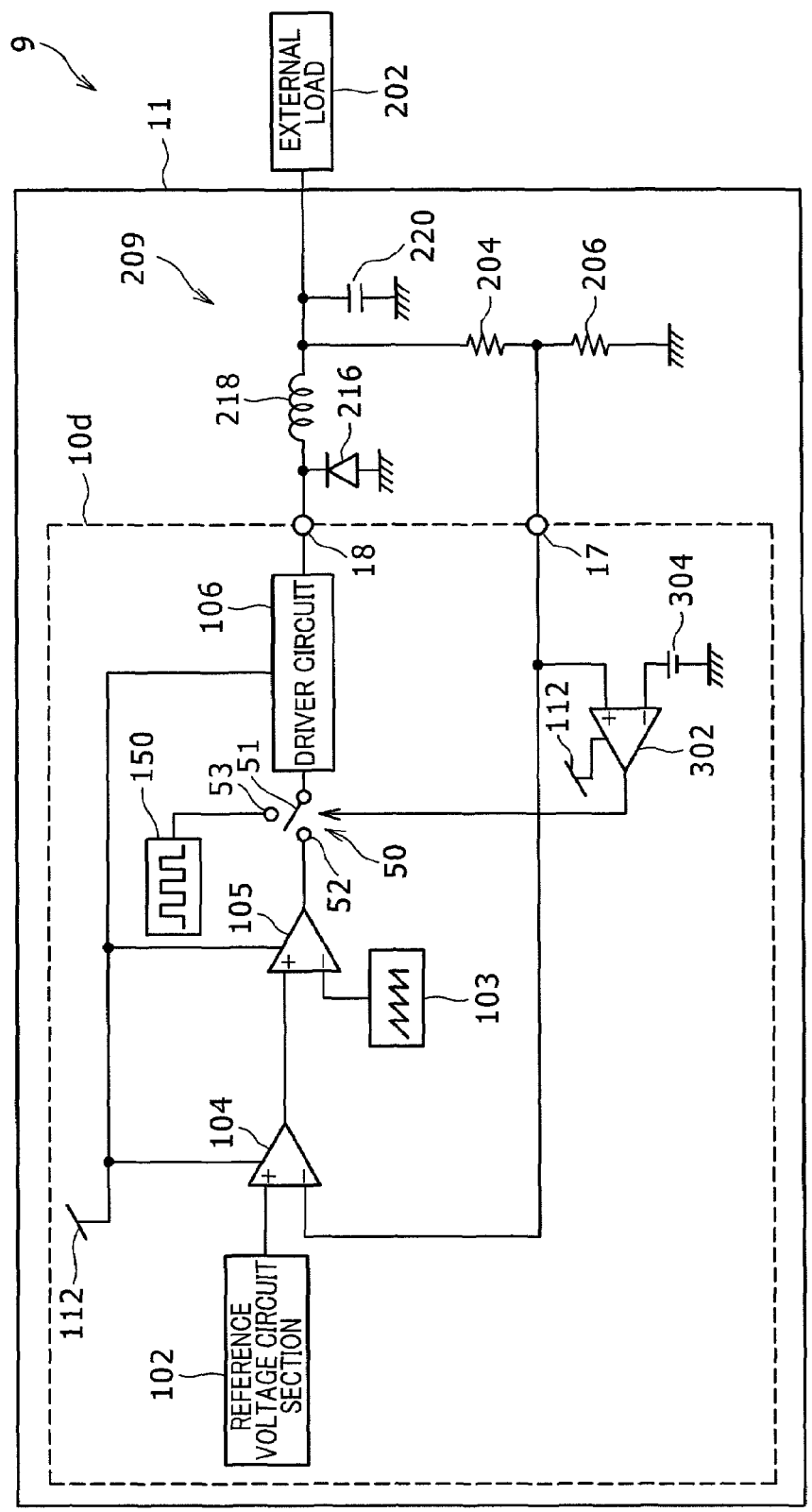
FIG. 4 is a diagram showing a semiconductor circuit according to a fourth preferred embodiment of the present invention and a power supply device having the semiconductor circuit.

Next, a semiconductor circuit 10d according to a fourth preferred embodiment of the present invention and a power supply device 9 having the semiconductor circuit 10d will be described with reference to FIG. 4. FIG. 4 is a diagram showing the semiconductor circuit 10d and the power supply device 9 having the semiconductor circuit 10d. As the structures are approximately the same as those of the semiconductor circuit 10a according to the first preferred embodiment and the power supply device 6 having the semiconductor circuit 10a, like reference numerals are assigned to like constituent elements, and repeated description is omitted. The differing structure and operation will primarily be described. A difference between the semiconductor circuit 10d and the semiconductor circuit 10a lies in a normal signal generating unit 150 and a switching circuit 50. The second input terminal of the operational amplifier 104 is connected to the first input terminal of the abnormality detection comparator 302 and the first terminal section 17.

The normal signal generating unit 150 is a PWM signal generating circuit which generates a PWM signal having a normal duty ratio.

The switching circuit 50 comprises a switch body section 51 which is connected to the input terminal of the driver circuit 106, a first switch terminal 52 which is connected to the output terminal of the PWM comparator 105, and a second switch terminal 53 which is connected to the output terminal of the normal signal generating unit 150. The switching circuit 50 is controlled based on the output of the abnormality detection comparator 302. More specifically, when the output of the abnormality detection comparator 302 is High, the switch body section 51 is connected to the first switch terminal 52, and the input terminal of the driver circuit 106 is connected to the output terminal of the PWM comparator 105. When, on the other hand, the output of the abnormality detection comparator 302 is Low, the switch body section 51 is connected to the second switch terminal 53, and the input terminal of the driver circuit 106 is connected to the output terminal of the normal signal generating unit 150.

Next, an operation of the power supply device 9 having the semiconductor circuit 10d having the above-described structure will be described with reference to FIG. 4. In the power supply device 9, when the electrical connection between the first external resistor element 204 and the second external resistor element 206 is not lost, the switch body section 51 of the switching circuit 50 is connected to the first switch terminal 52, and a negative feedback circuit is formed.

When, on the other hand, the electrical connection of the first external resistor element 204 is lost, similar to the case of the power supply device 6, the abnormality detection comparator 302 outputs Low, and the switch body section 51 of the switching circuit 50 is connected to the second switch terminal 53. Therefore, the output voltage from the output terminal of the PWM comparator 105 is not input to the input terminal of the driver circuit 106, and instead the normal PWM signal voltage from the normal signal generating unit 150 is input to the input terminal of the driver circuit 106. In this manner, even when the electrical connection between the first external resistor element 204 and the second external resistor element 206 is lost, a normal driver PWM signal is output from the driver circuit 106, and, thus, the output voltage of the second terminal section 18 does not become an excessive voltage. With this configuration, it is possible to prevent application of an excessive voltage to the external load 202.

What is claimed is:

1. A semiconductor circuit comprising:
   a first terminal section to be connected to a connection point between two external resistors which are connected in series;
   a second terminal section to be connected to an input terminal of an external circuit;
   a voltage circuit section having a first terminal connected to the second terminal section;

a reference voltage circuit section which outputs a predetermined voltage;

an operational amplifier having a first input terminal connected to the reference voltage circuit section, a second input terminal connected to the first terminal section, and an output terminal connected to a second terminal of the voltage circuit section;

an abnormality detecting circuit which detects an abnormal voltage of the first terminal section;

a normal signal generating unit which generates a normal signal; and a switching circuit which, when the abnormality detecting circuit detects an abnormal voltage, does not output a voltage based on the first terminal section to the second terminal section and instead outputs a normal voltage based on the normal signal to the second terminal section.

2. The semiconductor circuit according to claim 1, wherein the abnormality detecting circuit is an abnormality detection comparator wherein a first input terminal is connected to the first terminal section and a predetermined reference voltage is input to a second input terminal.

3. The semiconductor circuit according to claim 1, wherein the voltage circuit section comprises:
a PWM comparator wherein a first input terminal is connected to the output terminal of the operational amplifier and a triangular wave voltage or a sawtooth wave voltage is input to a second input terminal; and
a driver circuit having an input terminal connected to an output terminal of the PWM comparator and an output terminal connected to the second terminal section.

4. The semiconductor circuit according to claim 1, wherein the normal signal generating unit comprises:
a first resistor element having a first end connected to the output terminal of the operational amplifier; and
a second resistor element having a first end connected to a second end of the first resistor element and a second end grounded, and
the switching circuit switches, when the abnormality detecting circuit detects an abnormal voltage, a connection destination of the second input terminal of the operational amplifier from the first terminal section to a connection point between the first resistor element and the second resistor element.

5. The semiconductor circuit according to claim 1, wherein the normal signal generating unit comprises a smoothing circuit which smooths an output voltage of a driver circuit, and
the switching circuit switches, when the abnormality detecting circuit detects an abnormal voltage, a connection destination of the second input terminal of the operational amplifier from the first terminal section to the smoothing circuit.

6. The semiconductor circuit according to claim 3, wherein the normal signal generating unit comprises a voltage source which outputs a normal voltage, and
the switching circuit switches, when the abnormality detecting circuit detects an abnormal voltage, a connection destination of a first input terminal of the PWM comparator from the output terminal of the operational amplifier to the output terminal of the normal signal generating unit.

7. The semiconductor circuit according to claim 3, wherein the normal signal generating unit comprises a PWM signal generating circuit which generates a PWM signal of a normal duty ratio, and
the switching circuit switches, when the abnormality detecting circuit detects an abnormal voltage, a connection destination of the input terminal of the driver circuit from the output terminal of the PWM comparator to the output terminal of the normal signal generating unit.

* * * * *